US006405191B1

(12) United States Patent
Bhatt et al.

(10) Patent No.: US 6,405,191 B1
(45) Date of Patent: Jun. 11, 2002

(54) CONTENT BASED PUBLISH-AND-SUBSCRIBE SYSTEM INTEGRATED IN A RELATIONAL DATABASE SYSTEM

(75) Inventors: Neerja Bhatt, Mountain View; Dieter Gawlick, Palo Alto; Ekrem Soylemez, Foster City; Rahim Yaseem, Redwood Shores, all of CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/359,170

(22) Filed: Jul. 21, 1999

(51) Int. Cl.[7] .............................................. G06F 17/30
(52) U.S. Cl. .................... 707/3; 707/4; 707/5
(58) Field of Search .............................. 707/3, 10, 4, 5; 709/241, 226

(56) References Cited

U.S. PATENT DOCUMENTS

| 5,870,522 A | * | 2/1999 | Dozier et al. | 395/200.49 |
| 5,873,084 A | * | 2/1999 | Bracho et al. | 707/10 |
| 6,021,443 A | * | 2/2000 | Bracho et al. | 709/241 |
| 6,038,601 A | * | 3/2000 | Lambert et al. | 709/226 |

OTHER PUBLICATIONS

Clara Nippl, et al., "Accelerating Profiling Services by Parallel Database Technology," 9 pages, Department of Computer Science, Technische Universitat München, Arcisstr. 21, 80290 Munich, Germany.

Norman W. Paton, et al., "Active Database Systems," pp. 63–103, Mar. 1999, ACM Computing Surveys, vol. 31, No. 1.

PCT International Search Report dated Jun. 29, 2000, PCT/US 00/18043

WO 98 33131 A (Multex Systems Inc.) Jul. 30, 1998 abstract; Figure 1 p. 11, line 3–p. 14, line 13, p. 29, line 9, p. 30, line 26. .

Wyle M F: "A Wide Area Network Information Filter" Proceedings International Conference Artificial Intelligence on Wall Street, Oct. 9, 1991, New York, US, Los Alamitos, CA Oct. 9, 1991, pp. 10–15 XP000534152, p. 10, left–hand column, line 1 p. 12, right hand column, p. 24.

GB 2 274 182 A (Digital Equipment Int) Jul. 13, 1994 p. 1, line 3 p. 3, line 21 abstract; claim 1.

Binkley J et al: "Rama: An Architecture for Internet Information Filtering" Journal of Intelligent Information Systems: Artificial Intelligence and Database Technologies, NL, Kluwer Academic Publishers, Amsterdam vol. 5, No. 2, Sep. 1, 1995, pp. 81–99; XP000617268 ISSN: 0925–9902 abstract; figure 1 p. 83, line 20 p. 87, line 25.

(List continued on next page.)

Primary Examiner—Sanjiv Shah
(74) Attorney, Agent, or Firm—Hickman Palermo Truong & Becker LLP; Carina M. Tan; Edward A. Becker (57) ABSTRACT

A method and apparatus are provided for implementing a content based publish-and-subscribe system in a relational database system. A subscriber may request for messages by using a query language supported by the database server. The queries are then used as subscription rules for determining whether an incoming message is to be sent to the subscriber. Evaluation of incoming messages against subscription rules involves a two-tier process. The first tier involves filtering out all the subscription rules that could not possibly apply to the incoming message. The second tier involves further evaluation of the incoming message, if needed, to determine which subscribers are to receive the incoming message. In another aspect of the embodiment, in cases where the publisher is the relational database system itself, queries that request for messages are not stored as subscription rules because publication of the messages is implicit.

45 Claims, 4 Drawing Sheets-

OTHER PUBLICATIONS

Anonymous: "Method of Maintaining Continuity of Messages Over Publish/Subscribe System Failures" Research Disclosure, vol. 41, No. 414, Oct. 1, 1998, XP000041486 Havant, UK, article No. 41486 the whole document.

Patent Abtracts of Japan vol. 1995, No. 2, Mar. 31, 1995 & JP 06 319024 A (Nippon Rojisuteikusu KK), Nov. 15, 1994 abstract.

* cited by examiner

CONTENT BASED PUBLISH-AND-SUBSCRIBE SYSTEM INTEGRATED IN A RELATIONAL DATABASE SYSTEM

FIELD OF THE INVENTION

This invention relates to the publish-and-subscribe system and, more specifically, to methods and apparatus for integrating a content based publish-and-subscribe system with a relational database system.

BACKGROUND OF THE INVENTION

Communication models are used to handle the complexity of receiving messages from and distributing messages to multiple nodes in a distributed computing environment. An example of a communication model that is widely used is the publish-and-subscribe interaction system among applications. Entities that produce the messages or information are "publishers" and entities that are interested in the messages are "subscribers". The publish-and-subscribe model involves an asynchronous messaging capability, i.e., publishers need not wait for subscribers. For example, a producer of information simply "publishes" information on multiple communication channels and the consumer of information "subscribes" to the channels of interest. The publish-and-subscribe paradigm is said to be event-driven because communication between the producer of information and the consumer of information is triggered by business events. Also, the asynchronous nature of the messages dictates that any incoming message is an event.

In general, a messaging system uses a set of rules to ensure that a particular message gets to the right subscriber(s). A rule is a condition that describes the message or messages that are desired by a subscriber. A rules engine is used to apply the rules to the messages. There are a variety of standards governing the expression of the rules and the structure of the messages. However, there is no single standard that is widely used. The lack of a widely used standard has resulted in disparate tool sets for working with historical information (existing messages) versus future information (incoming messages). It is inefficient to maintain disparate tool sets in a messaging system.

Based on the foregoing, there is a need for a method or mechanism to implement the content based publish-and-subscribe system in an environment with widely used standards and to use a common tool set for working with historical information and future information.

SUMMARY OF THE INVENTION

The foregoing needs are addressed by the present invention, which comprises, in one aspect, a method and system for implementing a content based publish-and-subscribe system.

According to one aspect of the invention, an expression used in queries that is written in a query language supported by a relational database system is received from a subscriber and stored as a rule to determine whether an incoming message is to be sent to the subscriber. If the incoming message satisfies the rule, then the message is delivered to the subscriber. In one embodiment, the evaluation of the rules for determining whether an incoming message is to be sent to a subscriber is performed using a two-tier evaluation method. In another aspect of the invention, messages are implicitly published to the subscriber when the publisher is the relational database system itself.

According to the embodiment, the use of well established standards of a query language such as Structured Query Language ("SQL") in a content based publish-and-subscribe system enables the publish-and-subscribe system to take advantage of the existing knowledge base and toolsets of the query language.

Still other objects and advantages of the present invention will become readily apparent from the following detailed description, simply by way of illustration of the best mode contemplated of carrying out the invention. As will be realized, the invention is capable of other and different embodiments and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and system are described for implementing a content based publish-and-subscribe system in a relational database system. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

FUNCTIONAL OVERVIEW

According to one embodiment of the invention, a content based publish-and subscribe system is integrated in a relational database system. By integrating a content based publish-and subscribe system in a relational database system, the content based publish-and-subscribe system can take advantage of standardized forms of expression in expressing a message or requesting a message. For example, Structured Query Language ("SQL"), a language used to define, control access to, and manipulate data in a relational database system, is standardized by ANSI and the International Standards Organization. Therefore, a content based publish-and-subscribe system that is integrated in a relational database system can use SQL to request messages as well as to produce messages.

Moreover, the widely used standardized SQL allows for a common set of tools for working with historical information (existing messages) as well as future information (incoming messages). Messages are stored as rows in a database table and standard SQL statements are used to access message properties, message history and message content. For example, messages can be retained after consumption by a subscriber. The database system stores information about the history of each message, including the time when the message was queued for publishing, the time the message was published and the identity of the publisher and the subscriber. For example, a subscriber can request historical information on "all stock quotes with name=Oracle, which were published in the last 3 months".

Another advantage is that an administrator can specify a list of subscribers that can retrieve messages from the database message queuing system. Further, specific messages in the database queuing system can be directed to specific recipients who may or may not be subscribers to the queue, thereby overriding the subscriber list. An example of a message queuing system integrated with a database is the Oracle Advanced Queuing. A detailed description of Advanced Queuing is found in *Oracle Server Concepts*, Release 8.0.

Yet another advantage of integrating a content based publish-and-subscribe system in a relational database system is that existing SQL technology, such as indexes, can be used to optimize access to messages. Also, the existing SQL technology can be used for sophisticated filtering of the messages and the rules. For example, a rule may specify, "stock price quotes with stock name like Oracle". The SQL interpreter understands the phrase "name like Oracle". Another advantage is that all standard database features such as recovery and restart are supported.

A significant but easily overlooked advantage of integrating a content based publish-and-subscribe system in a relational database system is that the content based publish-and-subscribe system automatically benefits from any enhancements to the SQL interpreter, to any associated data types or to the queuing system in the relational database system.

According to the embodiment, subscribers use SQL (including ANSI/ISO 1992 standard, ANSI/ISO 1999 standard and extensions to the standards, etc.) to submit rules to the database system. Each rule describes the message or messages that are desired by the subscriber. Because the content based publish-and-subscribe system is integrated in a relational database system, any query submitted by a subscriber can qualify as a rule. When a query is initially submitted by a subscriber, the query can be executed and the results of the query are returned to the subscriber. The query results constitute the existing set of messages that satisfy the rule. The query is then stored as a subscription rule against which incoming messages can be evaluated. For the purposes of explanation, examples will be given with respect to a relational database in which information is stored in rows and columns that support the SQL language. However, the invention is not limited to that particular embodiment. For example, a subscription rule may be written using any data type that is supported by the relational database system such as eXtensible Markup Language ("XML") data type, SWIFT (Society for Worldwide Interbank Financial Telecommunication that specifies the data formats and protocol for transferring funds electronically) data type, multimedia data type, and spatial data type.

A rules engine is used to apply the stored subscription rules to incoming messages. If an incoming message satisfies a subscription rule, then the message is published to the particular subscriber that submitted the subscription rule. Note that there may be multiple subscribers who have submitted subscription rules that are satisfied by the incoming message. The message is published to all such subscribers.

According to an embodiment, an incoming message is evaluated against stored subscription rules using a two-tier evaluation mechanism. The first tier involves using a "Fast Evaluation" mechanism to filter out the stored subscription rules that could not possibly apply to the incoming message. Because the content based publish-and-subscribe system is integrated in the relational database system, the subscription rules may be stored in an index to allow for an efficient way to filter out the clearly inapplicable subscription rules. The first tier "Fast Evaluation" is further described hereafter.

In some cases, not all subscription rules will be filtered out during the first tier evaluation. Of those subscription rules that are not filtered out, some rules may require further evaluation to determine whether they apply to the incoming message. The further evaluation performed for those rules may be one of two types of evaluation. One type of further evaluation is referred to herein as a simple follow-on evaluation. A simple follow-on evaluation may be required if a subscription rule contains additional conditions comprising attribute-operator pairs that remain to be evaluated. The simple follow-on evaluation will be further described hereafter. The other type of further evaluation is referred to herein as a "Complete Evaluation". A Complete Evaluation may be required if, for example, a subscription rule contains complex conditions that cannot be evaluated using the "Fast Evaluation" mechanism.

According to one embodiment, the Complete Evaluation process involves using the relational database system's SQL interpreter to evaluate a message against a subscription rule. The "Complete Evaluation" mechanism will be further described hereafter.

According to an embodiment, the publication of messages may either be explicit or implicit. Explicit publication is when publishers place messages in a message queue for publication to various subscribers. Once the message has been placed in a message queue, it will be evaluated against stored subscription rules using the two-tiered evaluation mechanism mentioned above. On the other hand, implicit publication, also known as autopublishing, occurs even if no prior publications of certain information exist in the publish-and-subscribe system. Subscribers may submit subscription rules related to information that have no corresponding existing publication on the publish-and-subscribe system as long as the information is stored in the relational database. The database server fulfills the function of a publisher. For example, assume there is a subscriber who is interested in inventory information on a company. Assume there are no publications of such information in the publish-and-subscribe system. However, the inventory information is stored in the database. The subscriber's query is executed, and the results returned to him. However, instead of storing the query as a subscription rule against which an incoming message can be evaluated, a trigger is implemented to automatically publish to the subscriber any updates to the information that he had requested using the query. Thus the database server is now a publisher of the inventory information. Autopublishing is further described in greater detail hereafter.

According to one embodiment, specific messages in the database queuing system are directed to specific recipients. Such messages need not be evaluated against the stored subscription rules because the recipients of such messages are known.

FAST EVALUATION

An incoming message is evaluated against a set of subscription rules to determine which subscribers are to receive the message. Fast evaluation is a mechanism to quickly filter out any of the subscription rules that cannot possibly apply to an incoming message. By filtering out the subscription rules that cannot possibly apply to an incoming message, what is left is a relatively small subset of subscription rules against which the incoming message is evaluated.

Without the fast evaluation phase, each incoming message must undergo a complete evaluation against every stored subscription rule. A complete evaluation of an incoming message against every subscription rule is considerably more computationally expensive than fast evaluation followed by a "complete evaluation" against a smaller subset of the stored subscription rules.

ARRAY OF FILTERS

In one embodiment, the fast evaluation phase of message processing is performed using of an array of "filters". Each column or "box" of the array consists of a filter. According to one embodiment, a filter is an attribute-operator pair that includes: (1) a value that identifies a column of a table, and (2) a value that identifies an operator. The following attribute-operator pairs are examples of filters in a system where the message table includes the columns "name" and "price":

"name="

"name>"

"name<"

"price="

"price>"

"price<"

Figure 1:
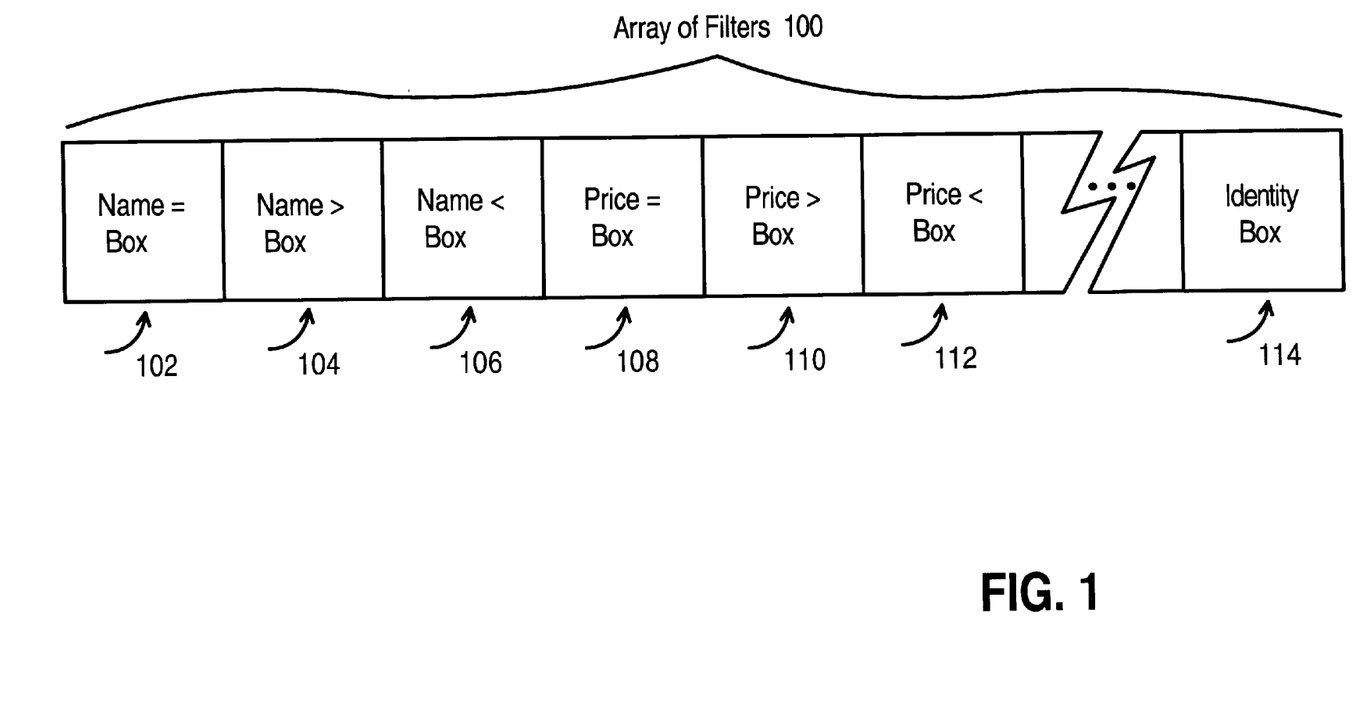
FIG. 1 is a block diagram illustrating an array of filters.

The attribute in an attribute-operator pair refers to any column or attribute in the message table. The operator in an attribute-operator pair refers to a relational operator. FIG. 1 illustrates an Array of Filters 100. The Array of Filters 100 consists of Boxes 102, 104, . . . 114. Each box consists of an attribute-operator pair, except for Box 114. Box 114 is known as the Identity Box. The Identity Box is associated with an array of subscription rules that do not fit in any of the other boxes in the Array of Filters 100. Subscription rules in the array of subscription rules associated with the Identity Box require the slower and more expensive process of "complete evaluation".

ARRAY OF SUBSCRIPTION RULES ASSOCIATED WITH EACH ATTRIBUTE-OPERATOR PAIR

When a subscriber submits a subscription rule, the database parser parses the subscription rule by first normalizing the subscription rule into a series expressions joined by disjunctive operators, where each expression is itself a series of one or more conditions joined by conjunctive operators. For example, the subscription rule, "stock quotes of stocks with name=Oracle and price<60 or name=Hewlett Packard and price<95" is normalized to:

(stock quotes of stocks with name=Oracle AND price<60) OR (stock quotes of stocks with name=Hewlett Packard AND price<95)

The above format of the subscription rule is known as a "Disjunctive Normal" form. Each disjunctive expression, shown in parenthesis above, is treated as a separate subscription rule and is stored in an "Array of Rules". Each Array of Rules is associated with one of the attribute-operator pairs in the Array of Filters described above.

For example, the subscription rule, "stock quotes of stocks with name=Oracle AND price<60", can be stored in an Array of Rules associated with either the attribute-operator pair, "name=" or the attribute-operator pair, "price<". According to one embodiment, in cases such as this where the subscription rule can be associated with more than one attribute-operator pair, the subscription rule is associated with the attribute-operator pair that costs the least to evaluate. In the case above, the cost of evaluation associated with either of the attribute-operator pairs is the same. However, assume that a subscriber submits the subscription rule, "stock quotes of stocks with name=Oracle AND complex condition", where the complex condition requires the more expensive computation of Complete Evaluation. In this case, the subscription rule, "stock quotes of stocks with name=Oracle AND complex condition" is stored in the Array of Rules associated with the attribute-operator pair, "name=". A complex condition can be, for example, a combination of user defined functions, a condition that requires accessing other tables in the database beyond the message table itself, and conditions that use the LIKE comparison operator.

Figure 2:
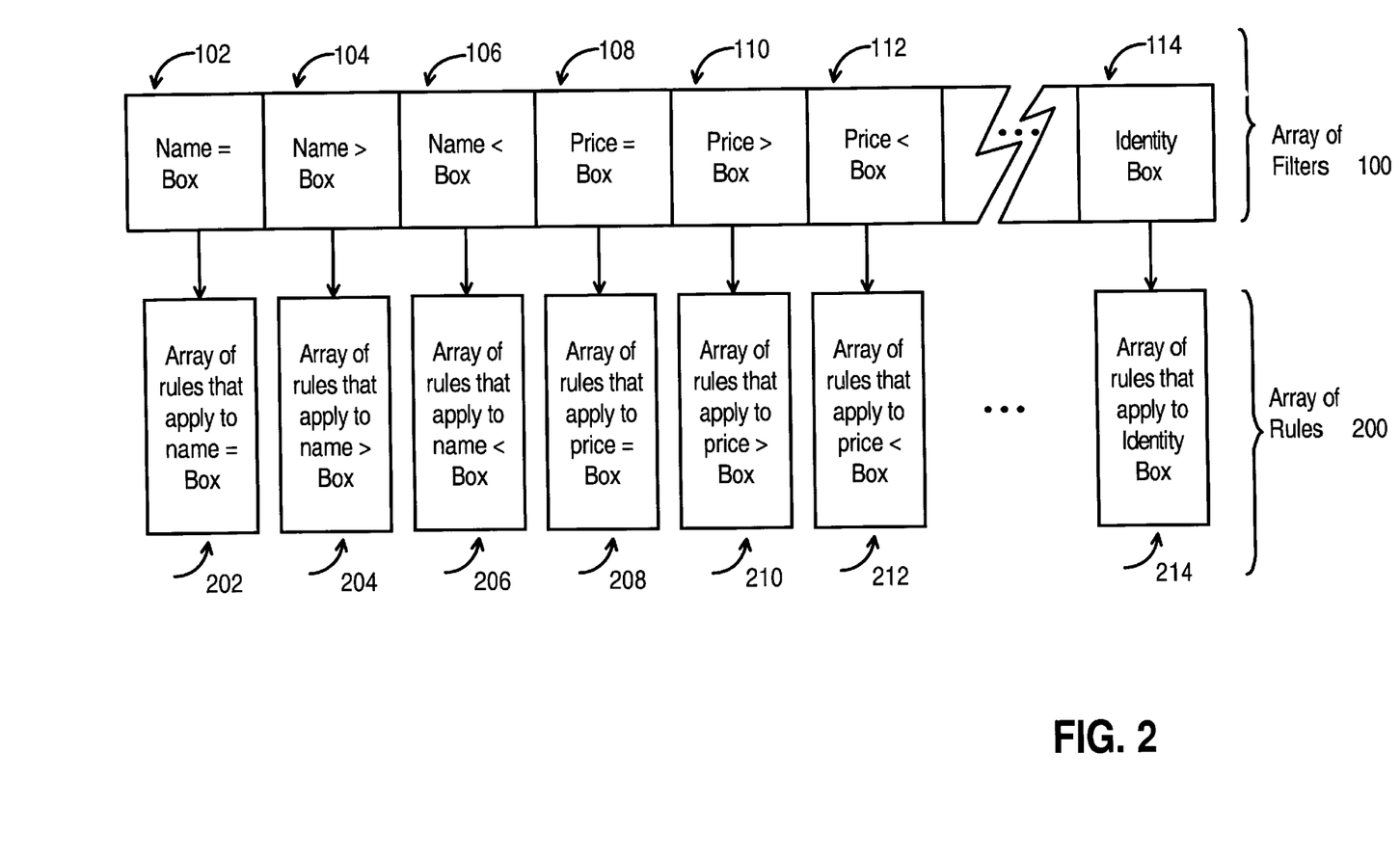
FIG. 2 is a block diagram illustrating an array of filters and associated arrays of rules.

FIG. 2 illustrates Array of Filters 100 and the Arrays of Rules 200 associated with the boxes of the Array of Filters 100. For example, Box 102, consisting of the attribute-operator pair, "name=", is associated with the Array of Rules 202 that apply to the "name=" attribute-operator pair. Similarly, Box 114, known as the Identity Box, is associated with the Array of Rules 214 that apply to the Identity Box 114.

Figure 3:
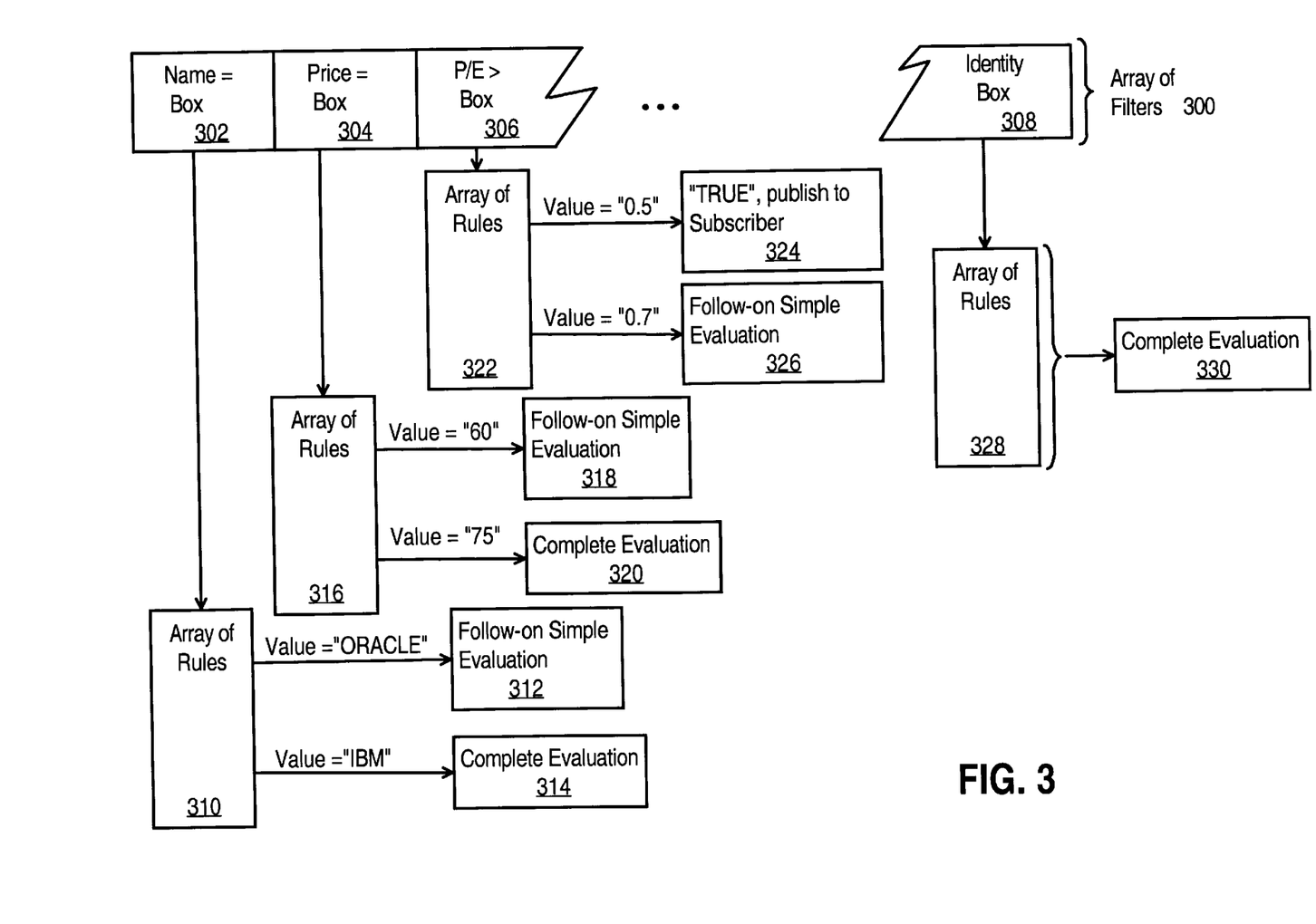
FIG. 3 is a block diagram illustrating further detail of the arrays of rules and follow-on processes.

Every subscription rule in each Array of Rules has a value. For example, FIG. 3 shows an Array of Filters 300. Associated with the first box in Array of Filters 300 is the Array of Rules 310 that apply to "name=" Box 302. One of the subscription rules in Array of Rules 310 has a value= "Oracle". Another subscription rule in the Array of Rules 310 that apply to "name=" Box 302 has a value="IBM". Only the values of two subscription rules in the array are shown for the purposes of illustration. The subscription rules in each Array of Rules are organized in an index based on the "value" of the subscription rule. The organization of the subscription rules in an index allows for efficient fast evaluation of an incoming message as described hereafter.

SIMPLE FOLLOW-ON EVALUATION

The fast evaluation mechanism of evaluating an incoming message may result in simple follow-on evaluation. If for example, not all subscription rules were filtered out during the fast evaluation process with respect to an incoming message, then the incoming message may be further evaluated using simple follow-on evaluation. To illustrate simple follow-on evaluation, assume that one of the subscription rules that was not filtered out by the fast evaluation mechanism was subscription Rule X from the Array of Rules 202 associated with Box 102 consisting of the attribute-operator pair, "name=" in FIG. 2. Further assume that Rule X comprises one or more conditions joined by conjunctive operators. For example, Rule X may look like, "stock quotes with name=Oracle AND price<60". Rule X was not filtered out because the incoming message satisfied the "name= Oracle" portion of Rule X. However, further evaluation is needed to determine if the incoming message satisfies the remainder portion of Rule X, namely, "price<60". The further evaluation in this case is said to be a simple follow-on evaluation because "price<60" involves a attribute-operator pair and thus can be evaluated quickly and cheaply. During simple follow-on evaluation, it is determined if the incoming message satisfies "price<60". If the incoming message satisfies "price<60", then the incoming message is published to the subscriber that submitted the subscription Rule X. Otherwise, Rule X is excluded from further consideration with respect to this particular incoming message.

COMPLETE EVALUATION

The fast evaluation mechanism of evaluating an incoming message may not filter out all complex subscription rules, and therefore may have to be followed by complete evaluation. Examples of complex subscription rules are:

"Indian restaurants within a 5 mile radius of the location of 500 Oracle Parkway".

"Dresses with a magenta floral design and price=$50"

"Company with name=Oracle and has an Indian restaurant on its campus"

In the above examples, the phrases, "within a 5 mile radius of", "with a magenta floral design", and "has an Indian restaurant on its campus" are considered complex conditions that require the SQL engine for interpretation. If during fast evaluation of an incoming message, there were one or more subscription rules that were not filtered out and that contained a complex condition requiring the SQL engine for interpretation, then the incoming message must undergo complete evaluation to determine if it satisfies those rules. To illustrate, assume that one of the subscription rules that was not filtered out by the fast evaluation mechanism was subscription Rule Y from the Array of Rules 202 associated with Box 102 consisting of the attribute-operator pair, "name=" in FIG. 2. Further assume that Rule Y comprises one or more conditions joined by conjunctive operators. For example, Rule Y may look like, "stock quotes with name=Oracle AND complex condition p". Rule Y was not filtered out because the incoming message satisfied the "name=Oracle" portion of Rule Y. However, further evaluation is needed to determine if the incoming message satisfies the remainder portion of Rule Y, namely, "complex condition p". The further evaluation in this case requires a full-blown evaluation using a SQL interpreter, and is known as "Complete Evaluation". Complete evaluation is computationally more expensive than either fast evaluation or simple follow-on evaluation.

If the incoming message satisfies "complex condition p", then the incoming message is published to the subscriber that submitted the subscription Rule Y. Otherwise, Rule Y is excluded from further consideration with respect to this particular incoming message.

With respect to subscription rules stored in Array of Rules 214 associated with the Identity Box 114, the incoming message is evaluated using Complete Evaluation. Recall that the subscription rules stored in Array of Rules 214 do not fit in any of the other boxes in the Array of Filters.

EVALUATING A MESSAGE

An incoming message is initially evaluated using the first tier Fast Evaluation mechanism in order to quickly filter out all the subscription rules that the incoming message cannot satisfy. The first tier evaluation of an incoming message against each subscription rule associated with a given box in the Array of Filters results in one of the following four states:

State 1: The subscription rule is not satisfied, therefore the subscription rule is excluded from further evaluation.

State 2: The subscription rule may be satisfied but simple follow-on evaluation is needed.

State 3: The subscription rule may be satisfied but second tier "complete evaluation" is needed.

State 4: The subscription rule is completely satisfied, therefore mark the subscription rule for the publication of the message to the subscriber that submitted the particular subscription rule.

If there is a very small number of subscription rules in the Array of Rules associated with the particular box in the Array of Filters, then the incoming message is evaluated against each subscription rule in the Array of Rules. However, if there were more than a predetermined number of subscription rules in Array of Rules, the subscription rules would be indexed based on the value of the subscription rule. The index would be searched to select only those subscription rules with a value that matches that of the incoming message, as explained in greater detail hereafter. When the incoming message has been evaluated against the last relevant subscription rule in the Array of Rules associated with a particular box, the evaluation proceeds to the next box in the Array of Filters, and so on.

FIG. 3 illustrates an Array of Filters 300 consisting of Boxes 302, 304, 306, . . . , 308. Each box is associated with an Array of Rules that Apply to the particular box. Box 302 is associated with Array of Rules 310. Box 304 is associated with Array of Rules 316. Box 306 is associated with Array of Rules 322 and Box 308 is associated with Array of Rules 328. For the purposes of illustration assume the following:

Array of Rules 310 contains only Subscription rule A and Subscription rule B.

Subscription rule A: "Stock with name=Oracle AND price=60".

Subscription rule A has a value=Oracle.

Subscription rule B: "Stock with name=IBM AND complex condition A".

Subscription rule B has a value=IBM.

Array of Rules 316 contains only Subscription rule C and Subscription rule D.

Subscription rule C: "Stock with price=60 AND name>Intuit".

Subscription rule C has a value=60

Subscription rule D: "Stock with price=75 AND complex condition B".

Subscription rule D has a value=75

Array of Rules 322 contains only Subscription rule E and Subscription rule F.

Subscription rule E: "Stock with P/E>0.5. Subscription rule E has a value=0.5.

Subscription rule F: "Stock with P/E>0.7 AND name<Microsoft".

Subscription rule F has a value=0.7.

Array of Rules 328 contains only Subscription rule G.

Subscription rule G: "Stock with complex condition E."

Incoming Message #1: "Stock name=Oracle AND Price=60 AND P/E>0.5."

Incoming Message #2: "Stock name=IBM AND Price=75 AND P/E>0.7 AND complex condition E."

The evaluation of Incoming Message #1 is explained with reference to FIG. 3. Incoming Message #1, as defined above, is first evaluated using the Fast Evaluation mechanism. Initially, it has not been determined whether any of the subscription rules apply to Message #1, so relative to Message #1 all of the subscription rules initially belong to the set of "possibly-satisfied rules".

With respect to the "name=" Box 302, Incoming Message #1 is evaluated against the subscription rules in Array of Rules 310. We have assumed that Array of Rules 310 contains only Subscription rule A and Subscription rule B.

Incoming Message #1 is evaluated against Subscription rule A that has a value="Oracle". The result of evaluating Incoming Message #1 against Subscription rule A is State 2, as defined above. Having a result of State 2 means that Incoming Message #1 must undergo simple follow-on evaluation against Subscription rule A to determine if Incoming Message #1 fully satisfies Subscription rule A.

According to one embodiment, the further evaluation takes place after Incoming Message #1 has been evaluated against all the subscription rules associated with each Box of the Array of Filters 300. The further evaluation of Message #1 for Subscription rule A is said to be a simple follow-on evaluation because Incoming Message #1 has to be evaluated against the remainder of Subscription rule A, which is "AND price=60". "AND price=60" involves a simple attribute-operator pair and thus can be evaluated quickly and cheaply.

Next, Incoming Message #1 is evaluated against Subscription rule B, which has a value="IBM". Clearly, name= "Oracle" of Incoming Message #1 does not satisfy Subscription rule B. Hence, the result of the evaluation is State 1 which means that Subscription rule B is excluded from the set of possibly-satisfied rules for Incoming Message #1. Once Subscription rule B has been excluded from the set of possibly-satisfied rules, it is excluded from further consideration as far as Incoming Message #1 is concerned.

According to one embodiment, if there were more than a predetermined number of subscription rules in Array of Rules 310, the subscription rules would be indexed based on the value of the subscription rule. The index would be searched to select only those subscription rules with value= "Oracle" to be included in the possibly-satisfied rule set of Incoming Message #1. Since Incoming Message #1 has been evaluated against all the subscription rules in Array of Rules 310, Incoming Message #1 is next evaluated with respect to the subscription rules in Array of Rules 316 associated with the "price=" Box 304.

If Array of Rules 316 contained numerous subscription rules, the subscription rules would be indexed based on the value of the subscription rules. The index would then be searched to select only those subscription rules with value= "60". In the example, Array of Rules 316 contains only Subscription rule C and Subscription rule D. The result of evaluating Incoming Message #1 against Subscription rule C is State 2, as defined above. Having a result of State 2 means that Incoming Message #1 must undergo simple follow-on evaluation against Subscription rule C to determine if Incoming Message #1 fully satisfies Subscription rule C. On the other hand, Subscription rule D has a value="75" and thus is eliminated from the set of possibly-satisfied rules for Incoming Message #1.

Incoming Message #1 is next evaluated with respect to the subscription rules in Array of Rules 322 associated with the "P/E>" Box 306. If the subscription rules in Array of Rules 322 were indexed based on the value of the subscription rules, then only those subscription rules having a value= "0.5" would be selected for inclusion in the set of possibly-satisfied rules for Incoming Message #1. Subscription rule F has a value="0.7", and thus is eliminated from the set of possibly-satisfied rules. The result of evaluating Incoming Message #1 against Subscription rule E is State 4. Having a result of State 4 means that Incoming Message #1 completely satisfies Subscription rule E and no further evaluation is needed with respect to Incoming Message #1 and Subscription rule E. Subscription rule E is marked for the publication of Incoming Message #1 to the subscriber that submitted Subscription rule C.

Thus, Incoming Message #1 is evaluated against all the subscription rules associated with each of the remainder number of Boxes in Array of Filters 300. With respect to Identity Box 308, Subscription rule G is the only subscription rule in the Array of Rules 328 associated with Identity Box 308. By definition, all subscription rules associated with the Identity Box require second-tier Complete Evaluation. Thus Incoming Message #1 must go through the process of Complete Evaluation with respect to Subscription rule G.

In order to illustrate further the features in the first-tier Fast Evaluation, Incoming Message #2 is evaluated using the process described above. If the subscription rules in Array of Rules 310 were indexed based on the value of the subscription rules, then only those subscription rules having a value="IBM" would be selected for inclusion in the set of possibly-satisfied rules for Incoming Message #1. With respect to the subscription rules in Array of Rules 310, Subscription rule A has a value="Oracle", and thus is eliminated from the set of possibly-satisfied rules for Incoming Message #2. When Incoming Message #2 is evaluated against Subscription rule B, the result is State 3. Having a result of State 3 means that Incoming Message #2 satisfies part of Subscription rule B and that second-tier Complete Evaluation is needed before it can be determined if Incoming Message #2 is to be published to the subscriber that submitted Subscription rule B.

With respect to the subscription rules in Array of Rules 316, Subscription rule C has a value="60", and thus is eliminated from the set of possibly-satisfied rules for Incoming Message #2. When Incoming Message #2 is evaluated against Subscription rule D, the result is State 3. Having a result of State 3 means that Incoming Message #2 satisfies part of Subscription rule D and that second-tier Complete Evaluation is needed before it can be determined if Incoming Message #2 is to be published to the subscriber that submitted Subscription rule D.

With respect to the subscription rules in Array of Rules 322, Subscription rule E has a value="0.5", and thus is eliminated from the set of possibly-satisfied rules for Incoming Message #2. When Incoming Message #2 is evaluated against Subscription rule F, the result is State 2. Having a result of State 2 means that Incoming Message #2 must undergo simple follow-on evaluation against Subscription rule F to determine if Incoming Message #2 fully satisfies Subscription rule F.

Finally, with respect to the subscription rules in Array of Rules 328, Incoming Message #2 must go through the process of Complete Evaluation with respect to Subscription rule G because Subscription rule G is associated with the Identity Box 308.

AUTOPUBLISHING

Autopublishing or implicit publishing occurs when there is a known interest in information stored in the relational database system. Interested entities may submit subscription rules associated with such information, and the database server becomes the publisher of such information. This is possible because the embodiment of the content based publish-subscribe system is tightly integrated in a relational database system. Thus, autopublishing occurs when a subscriber submits a request for a message using SQL (submits a query), and the message comprises information stored in a data table maintained by the database server. The subscriber's request for the message triggers publication by the database server. For example, the subscriber's query is executed, and the results of the query are returned to the subscriber. However, instead of storing the query as a subscription rule against which an incoming message can be evaluated, a trigger is implemented to automatically publish to the subscriber any updates to the information that he had requested using the query.

According to one embodiment, the trigger is implemented as a computer program stored in the database and associated with the data table containing information in which one or more subscribers have an interest. The trigger is activated or fired when an UPDATE action is requested for the data table. The trigger comprises three parts: a triggering statement, a trigger restriction, and a trigger action.

To illustrate, assume that the relational database maintains current inventory information for Retail Acme in a data table, Acme_Inventory. Each row of Acme_Inventory contains information on a particular type of widget. Further assume that Subscriber A is interested in Retail Acme's inventory of all widgets, and submits a query to check if the stock on hand of each type of widget is less than a specified quantity (a low inventory condition). Subscriber A wishes to be notified if the stock on hand of any widget type is less than a specified amount. Subscriber A's query will be executed and the results of the query will be returned him. Next, in response to Subscriber A's query, a trigger is implemented to automatically check the data table for low inventory condition whenever a row of the data table is updated, and to automatically publish any low inventory condition to Subscriber A. Thus, the triggering statement in this case is an UPDATE request on the data table, Acme_Inventory.

For example, when a customer buys a widget of type foobar 1 from Retail Acme, the row containing inventory information on foobar 1 widgets in data table, Acme_Inventory, is updated to reflect the reduced number of foobar 1 widgets. The trigger is fired in response to this update. Thus, the triggering statement may look like ". . . UPDATE of number_of_widgets_on_hand ON Acme_Inventory . . . ", which means when the NUMBER_OF_WIDGETS_ON_HAND column of a row in Acme_Inventory data table is updated, fire the trigger.

The trigger restriction specifies a logical expression that must evaluate to TRUE for the trigger to fire. In the above example, the trigger restriction may look like, "number_of_widgets_on_hand<reorder_quantity".

The trigger action is the computer code to be executed when the triggering statement is issued and the trigger restriction evaluates to TRUE. In the above example, the trigger action would be to publish the message about low inventory condition to Subscriber A. Thus, the trigger action is executed because the triggering statement, ". . . UPDATE of number_of_widgets_on_hand ON Acme_Inventory . . . ", issued and the trigger restriction, "number_of_widgets_on_hand<reorder_quantity", evaluates to TRUE.

MESSAGE DELIVERY

In the embodiment, before incoming messages are delivered to a subscriber, it is determined if the subscriber qualifies to receive any incoming message more than once. If it is determined that the subscriber does qualify to receive a given incoming message more than once, then that incoming message is delivered to the subscriber only once.

In the embodiment, the messages that are delivered to subscribers who are qualified to receive them include not only incoming messages but also messages that have been published at an earlier time and that were stored in the database. For example, a subscriber submits a subscription rule, "new announcements as well as announcements occurring during the last 3 months of employment opportunities at Oracle". Both incoming messages as well as previously published messages that were stored in the relational database and that satisfy the subscription rule will be delivered to the subscriber. Having been stored in the relational database, the previously published messages can be retrieved for publication to the new subscriber using existing data retrieval methods used by database servers.

In an embodiment of the invention, a subscriber may specify the delivery mechanism, the destination and notification protocol of the message as part of his query requesting the message. For example, the subscriber may specify in his query that he wishes to receive messages by means of e-mail. He can then specify an e-mail address at which to receive the message. Alternatively, the subscriber may specify in his query that he wishes to have his messages delivered to a remote database by means of a database link. In one embodiment, the database link can be created using SQL and it defines the database name, path, logon account, and protocol used to connect to the remote database. In addition, the subscriber may specify how quickly he would like to have a message delivered to him. For example, a first class protocol notification would ensure that a message is delivered to the subscriber within 0.5 seconds of the creation of the message.

In one embodiment of the invention, the delivery of a message may include an option for separate notification to one destination that the message is being delivered to another destination specified by the subscription rule. For example, a medical doctor sends in a subscription rule to obtain X-rays of John Doe. The medical doctor's subscription rule specifies that the X-rays are to be delivered electronically to his office computer and he also specifies that he is to be notified by pager (a small telecommunications device that receives short messages and will typically beep to alert the person carrying the pager) when the X-rays are en-route to his office computer.

In an embodiment of the invention, the message is not delivered to the subscriber (the entity that submitted the rule) but rather the recipient of the message or the destination of the message is determined from the context of the transaction. For example, assume that Mr. Bank Manager of Skinflint Union Bank sends in a subscription rule specifying that as soon as an account reaches a balance of $500,000 or more, the account holder will be notified that the account holder is to receive a free toaster from the bank. In this case, the messages are to be delivered to the account holders rather than to Mr. Bank Manager who is the subscriber. The nature of the transaction, namely, account balances exceeding $500,000, determines the recipient or destination of the "free toaster" message.

HARDWARE OVERVIEW

Figure 4:
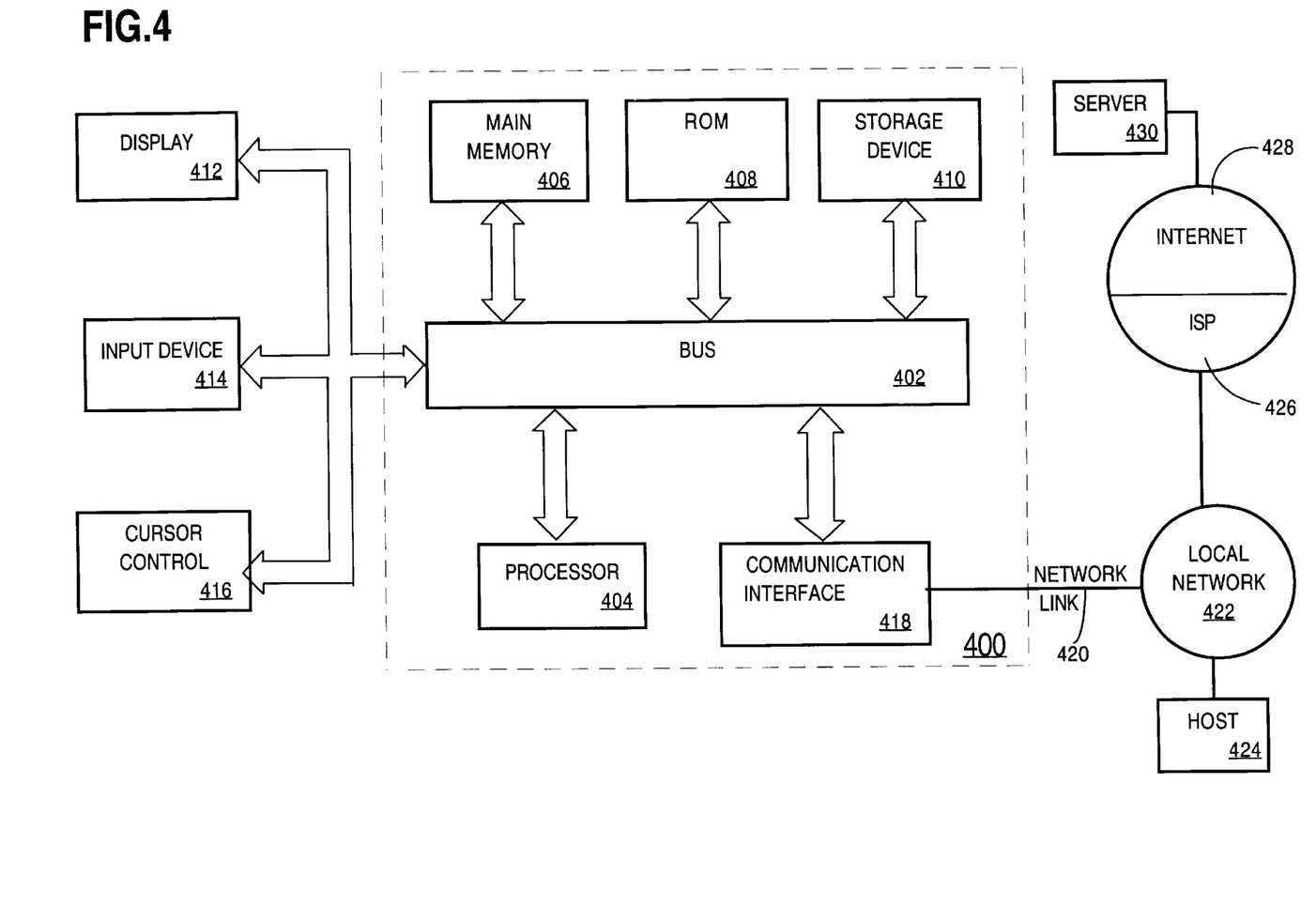
FIG. 4 illustrates a computer system on which embodiments of the present invention may be implemented.

FIG. 4 is a block diagram that illustrates a computer system 400 upon which an embodiment of the invention may be implemented. Computer system 400 includes a bus 402 or other communication mechanism for communicating information, and a processor 404 coupled with bus 402 for processing information. Computer system 400 also includes a main memory 406, such as a random access memory (RAM) or other dynamic storage device, coupled to bus 402 for storing information and instructions to be executed by processor 404. Main memory 406 also may be used for storing temporary variables or other intermediate information during execution of instructions to be executed by processor 404. Computer system 400 further includes a read only memory (ROM) 408 or other static storage device coupled to bus 402 for storing static information and instructions for processor 404. A storage device 410, such as a magnetic disk or optical disk, is provided and coupled to bus 402 for storing information and instructions.

Computer system 400 may be coupled via bus 402 to a display 412, such as a cathode ray tube (CRT), for displaying information to a computer user. An input device 414, including alphanumeric and other keys, is coupled to bus 402 for communicating information and command selections to processor 404. Another type of user input device is cursor control 416, such as a mouse, a trackball, or cursor direction keys for communicating direction information and command selections to processor 404 and for controlling cursor movement on display 412. This input device typically has two degrees of freedom in two axes, a first axis (e.g., x) and a second axis (e.g., y), that allows the device to specify positions in a plane.

The invention is related to the use of computer system 400 for a content based publish-and-subscribe system in a relational database. According to one embodiment of the invention, a content based publish-and-subscribe system in a relational database is provided by computer system 400 in response to processor 404 executing one or more sequences of one or more instructions contained in main memory 406. Such instructions may be read into main memory 406 from another computer-readable medium, such as storage device 410. Execution of the sequences of instructions contained in main memory 406 causes processor 404 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including but not limited to, non-volatile media, volatile media, and transmission media. Non-volatile media includes, for example, optical or magnetic disks, such as storage device 410. Volatile media includes dynamic memory, such as main memory 406. Transmission media includes coaxial cables, copper wire and fiber optics, including the wires that comprise bus 402. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 404 for execution. For example, the instructions may initially be carried on a magnetic disk of a remote computer. The remote computer can load the instructions into its dynamic memory and send the instructions over a telephone line using a modem. A modem local to computer system 400 can receive the data on the telephone line and use an infra-red transmitter to convert the data to an infra-red signal. An infra-red detector can receive the data carried in the infra-red signal and appropriate circuitry can place the data on bus 402. Bus 402 carries the data to main memory 406, from which processor 404 retrieves and executes the instructions. The instructions received by main memory 406 may optionally be stored on storage device 410 either before or after execution by processor 404.

Computer system 400 also includes a communication interface 418 coupled to bus 402. Communication interface 418 provides a two-way data communication coupling to a network link 420 that is connected to a local network 422. For example, communication interface 418 may be an integrated services digital network (ISDN) card or a modem to provide a data communication connection to a corresponding type of telephone line. As another example, communication interface 418 may be a local area network (LAN) card to provide a data communication connection to a compatible LAN. Wireless links may also be implemented. In any such implementation, communication interface 418 sends and receives -electrical, electromagnetic or optical signals that carry digital data streams representing various types of information.

Network link 420 typically provides data communication through one or more -networks to other data devices. For example, network link 420 may provide a connection through local network 422 to a host computer 424 or to data equipment operated by an Internet Service Provider (ISP) 426. ISP 426 in turn provides data communication services through the world wide packet data communication network now commonly referred to as the "Internet" 428. Local network 422 and Internet 428 both use electrical, electromagnetic or optical signals that carry digital data streams. The signals through the various networks and the signals on network link 420 and through communication interface 418, which carry the digital data to and from computer system 400, are exemplary forms of carrier waves transporting the information.

Computer system 400 can send messages and receive data, including program code, through the network(s), network link 420 and communication interface 418. In the Internet example, a server 430 might transmit a requested code for an application program through Internet 428, ISP 426, local network 422 and communication interface 418. In accordance with the invention, one such downloaded application provides for a content based publish-and-subscribe system in a relational database as described herein.

The received code may be executed by processor 404 as it is received, and/or stored in storage device 410, or other non-volatile storage for later execution. In this manner, computer system 400 may obtain application code in the form of a carrier wave.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for implementing a content based publish-and-subscribe system in a relational database system, the method comprising the steps of:

receiving a query that is written in a query language supported by the relational database system from a subscriber;

storing the query in the relational database system as a subscription rule for determining whether incoming messages are to be sent to the subscriber;

after storing the query, the relational database system determining whether the incoming messages satisfy the query; and publishing incoming messages to the subscriber when the incoming messages satisfy the query.

2. The method of claim 1 wherein the step of publishing incoming messages to the subscriber further comprises the steps of:

receiving incoming messages from a publisher;

upon receiving the incoming messages, determining whether the incoming messages satisfy the subscription rule; and if the incoming messages satisfy the subscription rule, then publishing the incoming messages to the subscriber.

3. The method of claim 2 wherein the step of determining whether the incoming messages satisfy the subscription rule further comprises the steps of:

evaluating the incoming messages against the array of rules associated with each column in an array of filters; and determining which subscription rules in the array of rules could possibly apply to the incoming messages;

evaluating the incoming messages against the subscription rules that could possibly apply to the incoming messages and determining if further evaluation is needed for the incoming messages; and if further evaluation is needed, then determining if a simple follow-on evaluation is needed, and if a simple follow-on evaluation is needed, then proceeding with the simple follow-on evaluation; and determining if a complete evaluation is needed, and if a complete evaluation is needed, then proceeding with the complete evaluation.

4. The method of claim 3 wherein the complete evaluation further comprises using a query language engine of the relational database system.

5. The method of claim 1 wherein the step of storing the query in the relational database system as a subscription rule further comprises the steps of:

creating an array of filters comprising one or more columns;

determining to which column in the array of filters the subscription rule applies; and storing the subscription rule in an array of rules that is associated with the column to which the subscription rule applies in the array of filters.

6. The method of claim 5 wherein the step of determining to which column in the array of filters the subscription rule applies further comprises the steps of:

parsing the query from the subscriber;

normalizing the query into a series of expressions wherein each expression comprises one or more conditions joined by conjunctive operators and wherein each expression is combined with each other expression using a disjunctive operator;

assigning each expression to one column in the array of filters; and storing each expression as the subscription rule in the array of rules that is associated with the column to which the subscription rule applies in the array of filters.

7. The method of claim 5 further comprising the step of organizing the array of rules in an index.

8. The method of claim 1 further comprising the step of specifying in the subscription rule a destination and a protocol for delivering the incoming messages.

9. The method of claim 1 wherein the step of publishing the incoming messages further comprises the step of delivering the incoming messages to a destination specified by the subscription rule submitted by the subscriber.

10. The method of claim 1 wherein the step of publishing the incoming messages further comprises the step of sending notifications of the incoming messages to a notification destination specified in the subscription rule submitted by the subscriber and in addition to delivering the incoming messages to a message destination specified by the subscription rule submitted by the subscriber.

11. The method of claim 10 wherein the notification destination is different from the message destination.

12. The method of claim 1 wherein the step of publishing the incoming messages further comprises the step of delivering the incoming messages to a destination deduced from the context that resulted in the publication of the message.

13. The method of claim 1 wherein the step of publishing the incoming messages further comprises the step of delivering the incoming messages using a protocol specified by the subscription rule submitted by the subscriber.

14. The method of claim 1 wherein the step of publishing the message further comprises the steps of:

determining whether the subscriber qualifies to receive the incoming messages more than once; and delivering the incoming messages only once.

15. The method of claim 1 further includes the step of publishing to the subscriber previously published messages that have not been published to the subscriber when the previously published messages satisfy the query.

16. A computer-readable medium carrying one or more sequences of instructions for implementing a content based publish-and-subscribe system in a relational database system, wherein execution of the one or more sequences of instructions by one or more processors causes the one or more processors to perform the steps of:

receiving a query that is written in a query language supported by the relational database system from a subscriber;

storing the query in the relational database system as a subscription rule for determining whether incoming messages are to be sent to the subscriber; and publishing incoming messages to the subscriber when the incoming messages satisfy the query.

17. The computer-readable medium of claim 16 wherein the step of publishing incoming messages to the subscriber further comprises the steps of:

receiving incoming messages from a publisher;

upon receiving the incoming messages, determining whether the incoming messages satisfy the subscription rule; and if the incoming messages satisfy the subscription rule, then publishing the incoming messages to the subscriber.

18. The computer-readable medium of claim 17 wherein the step of determining whether the incoming messages satisfy the subscription rule further comprises the steps of:

evaluating the incoming messages against the array of rules associated with each column in an array of filters; and determining which subscription rules in the array of rules could possibly apply to the incoming messages;

evaluating the incoming messages against the subscription rules that could possibly apply to the incoming messages and determining if further evaluation is needed for the incoming messages; and if further evaluation is needed, then determining if a simple follow-on evaluation is needed, and if a simple follow-on evaluation is needed, then proceeding with the simple follow-on evaluation; and determining if a complete evaluation is needed, and if a complete evaluation is needed, then proceeding with the complete evaluation.

19. The computer-readable medium of claim 18 wherein the complete evaluation further comprises using a query language engine of the relational database system.

20. The computer-readable medium of claim 16 wherein the step of storing the query in the relational database system as a subscription rule further comprises the steps of:

creating an array of filters comprising one or more columns;

determining to which column in the array of filters the subscription rule applies; and storing the subscription rule in an array of rules that is associated with the column to which the subscription rule applies in the array of filters.

21. The computer-readable medium of claim 20 wherein the step of determining to which column in the array of filters the subscription rule applies further comprises the steps of:

parsing the query from the subscriber;

normalizing the query into a series of expressions wherein each expression comprises one or more conditions joined by conjunctive operators and wherein each expression is combined with each other expression using a disjunctive operator;

assigning each expression to one column in the array of filters; and storing each expression as the subscription rule in the array of rules that is associated with the column to which the subscription rule applies in the array of filters.

22. The computer-readable medium of claim 20 further comprising one or more additional sequences of instructions which, when executed by the one or more processors, cause the one or more processors to perform the step of organizing the array of rules in an index.

23. The computer-readable medium of claim 16 further comprising one or more additional sequences of instructions which, when executed by the one or more processors, cause the one or more processors to perform the step of specifying in the subscription rule a destination and a protocol for delivering the incoming messages.

24. The computer-readable medium of claim 16 wherein the step of publishing the incoming messages further comprises the step of delivering the incoming messages to a destination specified by the subscription rule submitted by the subscriber.

25. The computer-readable medium of claim 16 wherein the step of publishing the incoming messages further comprises the step of sending notifications of the incoming messages to a notification destination specified in the subscription rule submitted by the subscriber and in addition to delivering the incoming messages to a message destination specified by the subscription rule submitted by the subscriber.

26. The computer-readable medium of claim 25 wherein the notification destination is different from the message destination.

27. The computer-readable medium of claim 16 wherein the step of publishing the incoming messages further comprises the step of delivering the incoming messages to a destination deduced from the context that resulted in the publication of the message.

28. The computer-readable medium of claim 16 wherein the step of publishing the incoming messages further comprises the step of delivering the incoming messages using a protocol specified by the subscription rule submitted by the subscriber.

29. The computer-readable medium of claim 16 wherein the step of publishing the message further comprises the steps of:

determining whether the subscriber qualifies to receive the incoming messages more than once; and delivering the incoming messages only once.

30. The computer-readable medium of claim 16 further includes the step of publishing to the subscriber previously published messages that have not been published to the subscriber when the previously published messages satisfy the query.

31. A relational database system comprising a memory that includes one or more sequences of one or more instructions which, when executed by one or more processors, cause the one or more processors to perform the steps of:

receiving a query that is written in a query language supported by the relational database system from a subscriber;

storing the query in the relational database system as a subscription rule for determining whether incoming messages ale to be sent to the subscriber; and publishing incoming messages to the subscriber when the incoming messages satisfy the query.

32. The relational database system of claim 31 wherein the step of publishing incoming messages to the subscriber further comprises the steps of:

receiving incoming messages from a publisher;

upon receiving the incoming messages, determining whether the incoming messages satisfy the subscription rule; and if the incoming messages satisfy the subscription rule, then publishing the incoming messages to the subscriber.

33. The relational database system of claim 32 wherein the step of determining whether the incoming messages satisfy the subscription rule further comprises the steps of:

evaluating the incoming messages against the array of rules associated with each column in an array of filters; and determining which subscription rules in the array of rules could possibly apply to the incoming messages;

evaluating the incoming messages against the subscription rules that could possibly apply to the incoming messages and determining if further evaluation is needed for the incoming messages; and if further evaluation is needed, then determining if a simple follow-on evaluation is needed, and if a simple follow-on evaluation is needed, then proceeding with the simple follow-on evaluation; and determining if a complete evaluation is needed, and if a complete evaluation is needed, then proceeding with the complete evaluation.

34. The relational database system of claim 33 wherein the complete evaluation further comprises using a query language engine of the relational database system.

35. The relational database system of claim 31 wherein the step of storing the query in the relational database system as a subscription rule further comprises the steps of:

creating an array of filters comprising one or more columns;

determining to which column it the array of filters the subscription rule applies; and storing the subscription rule in an array of rules that is associated with the column to which the subscription rule applies in the array of filters.

36. The relational database system of claim 35 wherein the step of determining to which column in the array of filters the subscription rule applies further comprises the steps of:

parsing the query from the subscriber;

normalizing the query into a series of expressions wherein each expression comprises one or more conditions joined by conjunctive operators and wherein each expression is combined with each other expression using a disjunctive operator;

assigning each expression to one column in the array of filters; and storing each expression as the subscription rule in the array of rules that is associated with the column to which the subscription rule applies in the array of filters.

37. The relational database system of claim 35 further comprising one or more additional sequences of instructions which, when executed by the one or more processors, cause the one or more processors to perform the step of organizing the array of rules in an index.

38. The relational database system of claim 31 further comprising one or more additional sequences of instructions which, when executed by the one or more processors, cause the one or more processors to perform the step of specifying in the subscription rule a destination and a protocol for delivering the incoming messages.

39. The relational database system of claim 31 wherein the step of publishing the incoming messages further comprises the step of delivering the incoming messages to a destination specified by the subscription rule submitted by the subscriber.

40. The relational database system of claim 31 wherein the step of publishing the incoming messages further comprises the step of sending notifications of the incoming messages to a notification destination specified in the subscription rule submitted by the subscriber and in addition to delivering the incoming messages to a message destination specified by the subscription rule submitted by the subscriber.

41. The relational database system of claim 40 wherein the notification destination is different from the message destination.

42. The relational database system of claim 31 wherein the step of publishing the incoming messages further comprises the step of delivering the incoming messages to a destination deduced from the context that resulted in the publication of the message.

43. The relational database system of claim 31 wherein the step of publishing the incoming messages further comprises the step of delivering the incoming messages using a protocol specified by the subscription rule submitted by the subscriber.

44. The relational database system of claim 31 wherein the step of publishing the message further comprises the steps of:

determining whether the subscriber qualifies to receive the incoming messages more than once; and delivering the incoming messages only once.

45. The relational database system of claim 31 further includes the step of publishing to the subscriber previously published messages that have not been published to the subscriber when the previously published messages satisfy the query.

\* \* \* \* \*